United States Patent [19]

Korb et al.

[11] 4,338,419
[45] Jul. 6, 1982

[54] PROCESS FOR TREATMENT OF HYDROGEL LENS WITH THIOLS

[75] Inventors: Donald R. Korb, Boston; Paul M. Gallop, Chestnut Hill, both of Mass.

[73] Assignee: Syntex (U.S.A.) Inc., Palo Alto, Calif.

[21] Appl. No.: 184,596

[22] Filed: Sep. 5, 1980

Related U.S. Application Data

[63] Continuation of Ser. No. 10,991, Feb. 9, 1979, abandoned.

[51] Int. Cl.$^3$ .................... C08F 8/34; G02C 7/04
[52] U.S. Cl. .................... 525/350; 351/160 H; 525/329; 525/337
[58] Field of Search .................... 525/329, 350; 351/160 R, 160 H

[56] References Cited
U.S. PATENT DOCUMENTS

| | | | |
|---|---|---|---|
| 2,517,127 | 8/1950 | Meitzner | 260/783 |
| 2,992,210 | 7/1961 | Gluckman | 525/350 |
| 3,282,903 | 11/1966 | Tocker | 525/350 |
| 3,284,420 | 11/1966 | Tocker | 525/350 |
| 4,056,496 | 11/1977 | Mancini | 351/160 X |
| 4,115,297 | 9/1978 | Bolto | 521/33 X |
| 4,128,318 | 12/1978 | Sieglaff | 351/160 R |

*Primary Examiner*—C. A. Henderson
*Attorney, Agent, or Firm*—Joseph I. Hirsch; Howard M. Peters

[57] ABSTRACT

The invention provides a method of treating hydrogels formed from the polymerization of monomers having reactive olefinic double bonds by contacting them with reactive thiol compounds. In a preferred embodiment where the hydrogel structure includes a cis-glycol containing unit, a suitable thiol is used in conjunction with a borate buffer. The present invention also provides materials that are treated with the above thiol compounds.

4 Claims, No Drawings

PROCESS FOR TREATMENT OF HYDROGEL LENS WITH THIOLS

This is a continuation of application Ser. No. 010,991, filed Feb. 9, 1979, now abandoned.

BACKGROUND OF THE INVENTION

1. Introduction

This invention relates to the treatment of hydrogels to reduce or eliminate their irritant effect when used for physiological applications, such as for soft contact lenses and to the materials treated by the methods of this invention.

2. Description of the Prior Art

Certain polymers and copolymers and hydrogels thereof are known to have physiochemical properties which make them suitable for prolonged contact with living tissue, blood and mucous membranes such as would be required for surgical implants, blood dialysis devices and the like. Hydrogels are known which are useful for the formation of so-called "soft" contact lenses such as, for example, as described in U.S. Pat. No. 4,056,496 incorporated herein by reference.

Before a hydrogel article, such as a soft contact lens or other biological article, is placed in contact with living tissue, it is generally prepared by known methods which include treatment with organic solvent and with aqueous solutions such as saline solutions. Typically, the hydrogel article is treated by boiling in a solvent, such as alcohol; an aqueous solution; distilled water; or any combination thereof and soaking or, equilibrating it in a physiologically compatible saline solution prior to use. Notwithstanding these procedures problems often arise by way of an inflammatory or immunological response in the surrounding tissue. It is well known, for example, that a certain portion of users of soft contact lenses are observed to have an inflammatory or other discomforting response. For such persons, the wearing of soft lenses results in an irritation and or inflamation of the eyes. Accordingly, it is a primary object of the present invention to reduce or eliminate the adverse response of these users to soft contact lenses.

SUMMARY OF THE INVENTION

The invention disclosed herein comprises the treatment of hydrogels formed from the polymerization of monomers having reactive olefinic double bonds or epoxide groups with certain mercaptan compounds. The mercaptans, or thiols as they are also known, of the present invention have reactive thiol groups which are easily alkylated and the mercaptans preferably are hydrophilic. In a preferred embodiment where the hydrogel structure includes a cis-glycol containing unit or side chain, a suitable mercaptan is used in solution in conjunction with boric acid or a salt or complex thereof. However, in such hydrogels the borate will provide advantageous results even absent the mercaptan.

Treatment of, for instance, soft lenses in accordance with the present invention has significantly reduced eye inflammation and irritation experienced by certain wearers of such lenses.

The present invention also provides materials that are treated with the above mercaptan compounds. Through the treatment with mercaptans in accord with the process of this invention, the hydrogels undergo chemical modification that neutralizes their causation of adverse responses when in contact with living tissue in at least some hosts, thereby providing a very beneficial effect.

DETAILED DESCRIPTION OF THE INVENTION

Thiol compounds useful in the present invention conform to the general formula

R:SH where R may be a neutral, acidic, or basic moiety. Where R is neutral, thiols within the scope of the invention include the following:

(a) hydrogen sulfide, $H_2S$ and aqueous soluble salts thereof, for example, sodium sulfide, $Na_2S$; and (b) thiol compounds having the general formula $$R^1CHR^2 \atop | \atop SH \qquad (I)$$

wherein $R^1$ and $R^2$ are the same or different and are selected from the group consisting of hydrogen; lower hydroxyl or lower alkyl, preferably having from one to four carbons; $-(CH_2)_n OR^3$ wherein n is an integer from 0 to 4 and $R^3$ is hydrogen or lower alkyl, preferably having from one to three carbons;

$$-(CH_2)_n-\overset{O}{\overset{\|}{C}}NR^4R^5$$

wherein $R^4$ and $R^5$ may be the same or different and are hydrogen or lower alkyl, preferably of from one to three carbons, and n is an integer from 1 to 3; an amino acid such as $$-(CH_2)_n-CH\overset{\displaystyle NH_3^+}{\underset{\displaystyle COO^-}{\diagdown}}$$

wherein n is an integer from 1 to 3; and salts thereof. The thiol compound may also be further substituted with other hydrophilic moieties, such as hydroxyl or amide groups to increase their aqueous solubility. Furthermore, the compound may have more than one thiol group. Examples of the above neutral thiols useful in the practice of this invention include, for instance, thiomethane, thioethane, mercaptopropanol, thioacetamide, N-methyl thiopropionamide, N,N-dimethyl thioacetamide, thiobutyramide, ethoxymethanethiol, 2,3-dimercaptopropanol, cysteine in either D or L form, 2-aminoethanethiol and the like. A preferred neutral thiol is mercaptoethanol.

Where R is acidic, thiols within the scope of the invention include the following:

(c) thiol compounds having the general formula (I) above in which at least one of $R^1$ and $R^2$ is $(CH_2)_q$ COOH wherein q is an integer from zero to four, and the other of $R^1$ and $R^2$ is as defined above; and salts thereof; and (d) sulfonic acids having the general formula

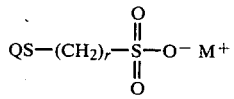

wherein r is an integer selected from zero to five, M+ is a cation, preferably an alkali metal, and Q is H or M+; and salts thereof. Examples of acidic thiol compounds useful in the practice of this invention include, for instance, sodium-β-mercaptopropionate, thiolactic acid, sodium thioacetate, sodium 4-hydroxy-2-thiobutyrate, 4-amido-3-thiobutyric acid, β-mercaptoethylsulfonate, and the like. A preferred acidic thiol is sodium thiosulfate.

Where R is basic, thiols within the scope of the invention include thiols and salts thereof having the general formula (I) above in which at least one of $R^1$ and $R^2$ is $(CH_2)_m R^6$, wherein m is an integer from one to five, $R^6$ is a primary, secondary or tertiary amino group, an amidine group, or a guanidine group, for instance $-NR^4R^5$,

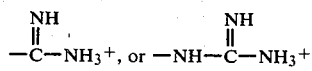

where $R^4$ and $R^5$ are as defined above, and quaternary salts thereof. Examples of basic thiols useful in the practice of this invention include, for instance, N-propyl-2-aminoethanethiol, thio methyl amidine hydrochloride, thiol methyl guanidinium chloride, and the like.

Most of the thiol compounds useful in accord with this invention are readily available or can be prepared without any difficulty according to well known methods of chemical synthesis.

It is generally desirable that the thiol used be water soluble to facilitate its removal from the hydrogel following treatment thereof. While organic solvent soluble thiols may be used, they are not preferred since the solvent itself is, in turn, difficult to remove from the hydrogel. Additionally, it is advantageous to keep the hydrogel in aqueous or aqueous-alcohol solution to keep it hydrated.

According to the process of this invention, the thiols are preferably used in slightly alkaline solution since the thiols are more reactive as pH increases. The solution pH is limited however by the need to avoid saponification of the ester bonds within the polymer network which would occur at a high pH. Preferably a pH of from about 8.0 to 9.5 is used.

Certain highly useful hydrogels, such as those described in U.S. Pat. No. 4,056,496, contain a cis-glycol group in the backbone or in a side chain of the polymer network. These materials are hydrogels of a sparingly cross-linked hydrophilic copolymer, of a major amount of a monoester of an olefinic acid selected from the group of acrylic and methacrylic acids having a single olefinic double bond and a minor amount of a polymerizable diester of one of said acids the diester having at least two olefinic double bonds.

Such hydrogels include a hydrophilic monomer from the group of dihydroxyalkyl acrylates and methacrylates (hereinafter collectively the "hydroxyalkyl acrylate"), a substantially water insoluble monomer from the group of alkyl acrylates and methacrylates (hereinafter collectively "the acrylate") and preferably, a minor amount of an epoxidized alkyl acrylate or methacrylate (hereinafter collectively the "epoxidized acrylate").

The polymer is formed by a free radical, bulk polymerization process in the substantial absence of solvent as this procedure is required to form polymers having properties suitable for the formation of the devices disclosed herein, particularly for use as a contact lens material when hydrated. The hydroxyalkyl acrylate is preferably used in major amount, the alkyl acrylate in minor amount and the epoxidized acrylate in an amount sufficient to impart desired rigidity.

The hydrogels from the polymers disclosed herein have some properties similar to 2-hydroxyethyl methacrylate (HEMA) and are suitable for formation of contact lenses as well as other items assimlated with living tissue such as surgical implants. However, a lens formed from the hydrogels herein do not suffer many of the disadvantages of lenses formed from HEMA. In this respect, though the hydrogels herein are soft and supple, they are stronger and stiffer than HEMA. Consequently, they provide steady vision avoiding difficulties associated with a changing optical surface. Further, since the hydrogels herein are stiffer than HEMA, a lens formed therefrom is capable of design with peripheral curvatures that maximize fluid flow and provides fresh lacrimal fluid to areas of the eye covered by the lens. The fluid provides oxygen and moves catabolic products from beneath the lens. Moreover, added stiffness permits fabrication of lenses of thinner cross-section than lenses formed from HEMA. This results in substantial oxygen and carbon dioxide permeability needed for normal corneal physiology. In addition, thin lens fabrication permits the flow of lacrimal fluid beneath the edges of the lens which flow is believed to be a pumping action activated by blinking. Such hydrogels are advantageously treated with a borate buffer solution in accord with another embodiment of this invention. As used herein the term "borate" includes boric acid, complexes of boric acid, and salts thereof. In this regard, a preferred embodiment comprises the use of a thiol as described above in conjunction with a borate buffer solution.

While not wishing to be bound by theory, the following is offered as a possible explanation of the advantageous effects derived from the use of borate buffer solutions.

Leading to the present invention, it was perceived that the cause of the irritation and inflammatory response suffered by some wearers of soft contact lenses particularly, could be (a) one or more irritant chemicals such as, for instance, unreacted monomers or impurities in the starting monomer materials that have not been washed out or that are mechanically trapped within the hydrogel such that they would not be removed by standard washing and boiling procedures, or (b) reactive olefinic end groups covalently bound within the polymer network capable of reacting with the adjacent tissue and thus causing an irritant response. It is believed that these reactive double bonds of the end groups or of the unreacted monomers may react with proteins in the adjacent tissue and thus cause an immunological response. It is believed that treatment of hydrogels in accord with the present invention either neutralize the reactive olefinic end groups present in the polymer and/or in the unreacted monomers, or facilitates washing the unreacted monomers or impurities out of the hydrogel structure, or provides a combination of the above effects.

The thiols of the present invention are believed to alkylate the unreacted double bonds at the end regions of polymer chains as shown:

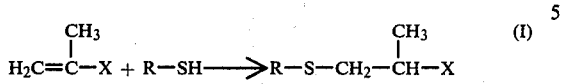
(I)

forming a thiol ether end group. X represents the polymer chain. Thus, these double bonds would not longer exist to interact with proteins in the adjacent living tissue.

Any unreacted monomers having olefinic double bonds or epoxide groups that are retained in the hydrogel would be converted as shown:

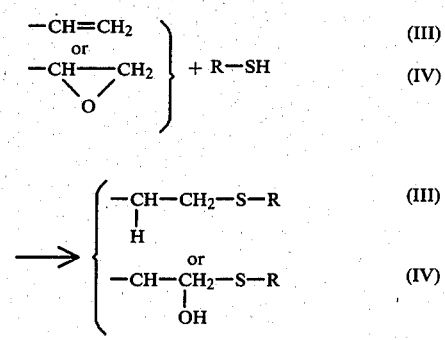

forming a thio ether (III) or hydroxy thioether (IV). According to the above suggested theory, alkylating an impurity makes it more hydrophilic particularly when an acid or other hydrophilic group is added. Thus, after treatment, the more hydrophilic compound can then be more effectively washed out of the hydrogel by aqueous solutions. In the alternative, the alkylation of the impurity neutralizes the reactive olefinic double bond so that the impurity does not react with proteins forming a hapten group which can induce an immune response.

According to a further aspect of the theory of this invention, acid group thiols, such as mercapto carboxylic acids, thio sulfonic acids, or the salts thereof may perform an additional function. It is believed that upon reacting with double bonds or epoxides within the polymer network, they thereby introduce a charge into the polymer network providing a polyelectrolyte effect. This is believed to cause the polymer network to expand due to the polyelectrolyte effect and facilitate removal of impurities or permit otherwise trapped impurities to be released and washed out.

Returning to the suggested use of solutions of borates, the polyelectrolyte effect described above is again applicable. Where the polymer contains the cis-glycol grouping such as the polymer described in U.S. Pat. No. 4,056,496, the addition of a borate causes the following reaction:

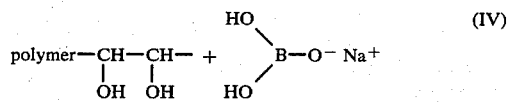
(IV)

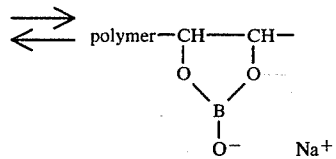

Again, an expansion of the polymer network is provided by the introduction of many negatively charged groups, thus facilitating the release of impurities. Following treatment, the hydrogel is washed to remove the borate since the reaction is reversible. This washing to remove the borate can be aided by the addition of a compound containing a cis-glycol group, such as mannitol, ethylene glycol, or 1,3 propanediol to the washing medium. Sugars are particularly useful in this regard.

In accord with this theory, the use of borates would be effective for treatment of, for example, glycerol methacrylate containing polymers, even in the absence of a thiol compound.

In this regard, greatest advantage for hydrogels containing cis-glycol units is seen in the use of a borate and thiol in conjunction because the borate could perform the double function of inducing the polyelectrolyte effect with the polymer and in addition buffering the solution at the desired pH to make the thiol compound most effective for neutralizing unreacted olefinic double bonds.

The process of the present invention generally involves immersing, at room to boiling temperatures, the hydrogel material, such as in the form of soft contact lenses, in an aqueous solution comprising one or more of the thiol compounds discussed above and/or a borate buffer. Following this treatment, the washing procedures typically employed in the art may be used. This would include, for example, repeated boilings in distilled water and subsequent equilibrating in physiological saline.

The thiol may be used in solution concentrations ranging from about 1% by weight to saturation. Due to the nature of hydrogels being three dimensional networks through which irritants must diffuse, periods of treatment from about 5 to 24 hours are typical. The particular concentration and treatment period can be readily selected by routine experiments. Those skilled in the art will of course realize that the treatment period and concentration may be interrelated.

The borate may be present in concentrations of from about 1% by weight to saturation. Preferably, it is present in concentration sufficient to adequately buffer the treatment solution to the desired pH range when used in conjunction with a thiol compound in accord with a preferred embodiment of this invention and also to react with the polymer network to form the borate-polymer chelate adduct.

The preparation of the hydrogels used in this invention are further described in the following preparations.

PREPARATION 1

Fifty grams of isopropylideneglyceryl methacrylate, 150 ml of water, 0.3 g of concentrated sulfuric acid, and 0.02 of hydroquinone are stirred for 16 hours at 25°–30° C. A clear colorless solution forms. Sulfuric acid is neutralized by addition of barium hydroxide. The precipitate (barium sulfate) is removed by filtration and washed with water. The filtrate and washings are combined to give 212 ml of a clear, colorless solution, calculated to consist of a 20% solution of 2,3-dihydroxypropyl methacrylate in dilute aqueous acetone (12/1). The product is isolated by saturation with sodium chloride and extracted with benzene or ether. After stripping solvent at reduced pressure, 2,3-dihydroxypropyl methacrylate (glyceryl methacrylate) is obtained as a slightly viscous oil.

A preferred comonomer herein is glyceryl methacrylate. The monomer may be made by the above process, but is preferably prepared in accordance with the process described by M. F. Refojo, *Journal of Applied Polymer Science*, Volume 9, pp 3161 to 3170 (1965) where glycidyl methacrylate is hydrolyzed and then solvent extracted as illustrated below.

PREPARATION 2

One hundred grams of glycidyl methacrylate, 150 ml distilled water and 0.25 ml concentrated sulfuric acid are stirred for 6 days at room temperature.

Glycidyl methacrylate is immiscible with water, but its product, glyceryl methacrylate, is formed which is soluble and a clear solution is formed. The glyceryl methacrylate co-dissolves unreacted glycidyl methacrylate.

The reaction mixture is neutralized with a 10% sodium hydroxide solution and extracted with five 100 ml aliquots of ether. The extract is washed with three 20 ml portions of distilled water and the aqueous solution is washed with 50 ml of ether. The combined ether extracts are dried with anhydrous sodium sulfate. The ether is evaporated in a rotating evaporator. The residue (18.8 grams) from the ether extract is mainly glycidyl methacrylate suitable for preparation of additional glyceryl methacrylate.

The aqueous extract is saturated with sodium chloride with glyceryl methacrylate separating as an oily layer. This layer is dissolved in methylene chloride, dried with anhydrous sodium sulfate and evaporated using the above procedure. The residue (71.6 g) is a viscous, clear liquid of glyceryl methacrylate containing some unreacted glycidyl methacrylate.

The concentration of glycidyl methacrylate remaining in the above reaction mixture following solvent extraction is dependent upon the extraction efficiency, the concentration typically varying between about 1.8 to 2.2 percent of the total glyceryl methacrylate for the procedure described, but being capable of reduction to essentially 0 with a more efficient solvent such as methylene chloride in place of the ether.

Other dihydroxyalkyl acrylates can be made from their corresponding epoxy alkyl esters by the process described in the above examples, the examples being set forth for purposes of illustration only.

The second comonomer is a substantially water insoluble alkyl acrylate or methacrylate corresponding to the general formula:

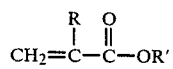

where R is hydrogen or methyl and R' is alkyl having from 1 to 6 carbon atoms. Alkyl acrylates conforming to this formula are readily available. Examples of suitable acrylates include methyl acrylate, methyl methacrylate, ethyl acrylate, ethyl methacrylate, propyl methacrylate, butyl acrylate and butyl methacrylate. Methyl methacrylate is most preferred.

The third comonomer is the epoxidized alkyl acrylate conforming to the formula

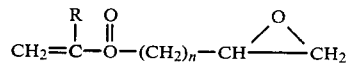

where R is hydrogen or methyl and n is a whole integer having a value of from 0 to 4, preferably from 1 to 4. Examples of suitable epoxidized acrylates include 2,3-epoxypropyl acrylate, 2,3-epoxypropyl methacrylate, and the like.

The preferred epoxidized acrylate is that used to form the dihydroxy acrylate if the procedures of Preparation 2 are employed. Thus, the epoxidized acrylate is preferably the source of the hydroxy acrylate monomer.

The molar ratio of dihydroxyalkyl acrylate to alkyl acrylate can vary within broad limits dependent upon the use to which the material is to be put. Preferably the ratio varies within the range of from 1:3 and 20:1. Preferably, the dihydroxyalkyl acrylate at least equal or exceeds the alkyl acrylate and a referred ratio varies between about 1:1 and 10:1, more preferably between 1.2:1.0 and 2:1. For use of the hydrogel as a contact lens material, the most preferred molar ratio is about 1.5:1.0.

The amount of epoxidized acrylate used may vary within broad parameters, generally from 0 to 30% by weight of the dihydroxy acrylate, more preferably, from 0.1 to 15% by weight and most preferably, from 3.2 to 7.5% dependent upon the monomers used, their ratio and the like. A more definite amount is the amount sufficient to provide a polymer capable of adsorbing water of hydration in an amount of from 35 to 50%, and more preferably, from 42 to 46%.

It is believed that the epoxidized acrylate acts as a crosslinking agent for the polymer. In this respect, other crosslinking agents may be included in the formulation such as diesters of acrylic and methacrylic acid as well as derivatives thereof such as triethanolamine dimethacrylate, triethanolamine trimethacrylate, tartaric acid dimethylacrylate, triethylene glycol dimethacrylate, the dimethacrylate of bis-hydroxyethylacetamide, and the like. The amount of crosslinking agent is dependent upon the desired properties of the polymer. In general, the concentration should not exceed 5% of the total monomer constituents and should be sufficient to yield a hydrogel from the polymer having the above hydration properties.

The hydrogels are formed by bulk polymerization using suitable catalysts. The monomers are mixed in the absence of solvent and maintained under reduced pressure at an elevated temperature for a period of time sufficient to solidify the reaction mixture. Typically, the temperature of reaction varies between 20° and 60° C., preferably between 35° and 42° C. and most preferably is maintained at about 40° C. The catalyst concentration may vary within broad limits dependent upon the particular catalyst used, but generally varies between about 0.001 and 0.2 weight percent of the hydroxyalkylacrylate, and preferably between 0.01 and 0.04 weight percent. A preferred catalyst is isopropyl percarbonate in an amount of about 0.02 weight percent.

The epoxidized acrylate comonomer may be present in the dihydroxy acrylate if formed by hydrolysis of its epoxy precursor as in Example 2, if not removed completely by solvent extraction. This is in part due to the dihydroxyalkyl acrylate being a cosolvent for the epoxy acrylate in the aqueous phase. If the amount of epoxidized acrylate remaining after extraction is less than the amount required, its concentration can be increased by addition of additional epoxidized acrylate or by other conventional crosslinking agents such as those described above.

For use as a contact lens, the hydrogels preferably have certain properties. The present hydration with water has been discussed above. Preferably, the percent hydration varies between 35 and 50% by weight and more preferably, from 42 to 46%. Another important property is the percent linear elongation. Preferably, the hydrated gel will exhibit a liner expansion of from 15 to 25% and more preferably, from 18 to 21%. A final important property is its hardness. Preferably, it has a Shore A durometer Type A-2 reading (ASTM Designation D2240-68) of from 40 to 50 and more preferably, from 42 to 47.

As to the degree of crosslinking of the gels from the polymers described herein, a guide to the extent of crosslinking is the solubility properties of the gels in various organic solvents. In general, the gels are insoluble in solvents such as dioxane, acetone, methylene chloride and mixtures thereof. In fact, no solvent has as yet been found that dissolves the gels though it is obvious that not all solvents have been tested.

The specific properties of a hydrogel in accordance with this invention are of course dependent upon the specific monomers used, the ratios thereof and the concentrations of crosslinking agent. In general, a hydrogel exhibiting the aforesaid properties may be obtained by following the most preferred embodiments of the invention described herein.

PREPARATION 3

A mixture of 56.8 g of 2,3-dihydroxypropyl methacrylate (GMA-made in accordance with Preparation 2 above and containing 1.28% glycidyl methacrylate) and 23.7 g of methyl methacrylate (MMA-mole ratio of 1.5:1.0) is stirred and 3 g of sodium sulfate added to remove traces of water. The mixture is filtered and 15.5 mg of isopropyl percarbonate added. The mixture is stirred thoroughly and transferred to a large tube.

The tube is then put in a low temperature bath, purged with nitrogen three times, sealed under vacuum and placed in a constant temperature bath at between 35° and 40° C. whereby polymerization occurs. Temperature is maintained for about five hours, though after about the first 90 to 95 minutes, the mixture had solidified indicating that reaction had taken place. The time for solidification will hereinafter be referred to as the "polymerization time". After five hours, the tube is placed in an oven maintained at 75° C. for 16 hours (overnight). The temperature is then raised to 90° C. and held at this temperature for one hour.

The polymer formed above can be removed from the tube into the form of a solid rod. When cut into thin discs or shaped into the form of a lens and placed in water, it becomes hydrated and develops a soft, rubbery consistency.

The process of this invention will be further illustrated by the following examples.

EXAMPLE I

Fifteen soft contact lenses made from a hydrogel having cis-glycol groups and having been polymerized from monomers having reactive olefinic double bonds were placed in commercially available tissue capsules. Eight of the lenses were boiled for 24 hours under nitrogen atmosphere in a solution containing 5% by volume of mercaptoethanol in distilled water. The solution was changed every three hours for the first twelve hours. As a control, seven lenses from the same stock were treated in the same manner substituting distilled water for the thiol-containing solution.

All fifteen lenses were inspected for power and diameter in their hydrated state, both before and after treatment. All fifteen lenses displayed substantially no change in power and an equal increase in diameter regardless of which treatment was used.

EXAMPLE II

Example I was repeated using 20 lenses of the same hydrogel by boiling half the lenses in a 5% by weight solution of 2-aminoethanethiol in distilled water, and the other half in distilled water. After boiling for 25 hours, the lenses were boiled three times for thirty minutes in fresh saline solution. Inspection of the hydrated lenses as described in Example I before and after treatment revealed no significant change in power and no significant difference between the 2-aminoethanethiol treated lenses and the control lenses.

EXAMPLE III

Example II was repeated with 20 lenses using a 5% by weight solution of 2,3-dimercaptopropanol dissolved in methanol to treat half the lenses, and pure methanol for the remainder. After boiling for 24 hours, the lenses were transferred to a solution containing 1:1 ratio by volume of methanol and water and boiled for 30 minutes followed by boiling twice for 30 minutes in distilled water. No significant differences were seen between the control and sample lenses with respect to the optical parameters of diameter and power as measured before and after treatment.

EXAMPLE IV

Eighteen contact lenses of various types of hydrogel polymers (all having been polymerized from monomers having reactive olefinic double bonds) were obtained from individuals who had developed allergic reactions severe enough to prevent the contact lenses from being worn. The lenses were first cleaned with a commercially available lens-cleaning surfactant sold under the tradename Preflex by Burton, Parsons Company of Washington, D.C., by rubbing between the fingers with light pressure. The lenses were then rinsed with saline, followed by cleaning in a commercially available papaine enzyme preparation sold under the tradename Soflens by Allergan Corp. The lenses were then rinsed with distilled water. The same or a similar series of cleaning steps had been previously attempted by the wearers without a significant reduction in irritation. Before boiling, the hydrated lenses were inspected for power and diameter. The lenses were placed in tissue capsules and boiled in a solution containing 20% by weight of sodium thiosulfate in distilled water for between 5 and 24 hours. When boiling was continued for 24 hours, the solution was typically changed about every three hours during the first twelve hours of boiling. After boiling in the thiosulfate solution, the lenses were boiled 3 times for 30 minutes in distilled water, rinsed with distilled water, reinspected to insure that no significant change had taken place in power or diameter, and then placed in fresh saline solution for transport back to the wearer.

The treated lenses were returned to the wearers who wore the lenses for a period of time and were then reexamined. The examination consisted of a subjective and an objective portion. The subjective portion was conducted by asking for the wearer's report of subjective comfort in such a way as to most likely obtain a response of "no improvement". This report was combined with an objective exam of the eye and its adnexa (lids, conjunctiva, etc.). The results are reported in Table I below where it is seen that three out of eighteen experienced significant improvement and two out of eighteen experienced dramatic improvement.

EXAMPLE V

Example IV was repeated using 11 similar lenses, substituting a solution of 5% by volume of mercaptoethanol in distilled water, and boiling under a nitrogen atmosphere. The results detailed in Table I below reveal that seven of the eleven wearers experienced significant improvement and one wearer experienced dramatic improvement.

EXAMPLE VI

The preliminary cleansing procedure described in Example IV was performed on the lenses of four wearers. This was followed by treatment with mercaptoethanol as described in Example IV, followed by treatment with sodium thiosulfate as described in Example V. The lenses were boiled three times for 30 minutes in distilled water and then placed in fresh saline solution for return to the wearer. As reported in Table I below, two of the four wearers reported significant improvement.

TABLE I

| EXAMPLE | No. of Lenses Treated | No Improvement | Significant Improvement | Dramatic Improvement |
| --- | --- | --- | --- | --- |
| IV | 18 | 13 | 3 | 2 |
| V | 11 | 3 | 7 | 1 |
| VI | 4 | 2 | 2 | — |

EXAMPLE VIII

Soft contact lenses made from a hydrogel polymer containing cis-glycol groups and which were polymerized from monomers having reactive olefinic double bonds are washed in accordance with the preliminary washing procedure described in Example IV. The washed lenses are boiled for 24 hours in a solution containing 6% by weight of sodium borate and 5% by volume of mercaptoethanol dissolved in distilled water, followed by boiling three times for 30 minutes in a solution of distilled water containing about 2% by volume of mannitol. This is followed by boiling three times for thirty minutes in distilled water. The treated lenses are then placed in fresh saline solution for distribution to wearers who have previously experienced allergic reactions from wearing such lenses.

The ultimate efficacy of treatment in accord with this invention cannot be determined from the limited experiments conducted as described above but must await extensive studies conducted with numerous subjects. However, it is apparent from the above examples that it is now possible to reduce the allergic response some people develop toward hydrogels, by treating the hydrogel with a thiol either before or after its initial use. In addition, where the hydrogel contains cis-glycol units in its structure, it is preferred to combine the thiol treatment with treatment by borate. The presently preferred combination is mercaptoethanol and sodium borate.

The treatment can be performed anytime after the manufactured hydrogel polymer has been hydrated, although it is preferable to wait until the hydrogel is formed into its ultimate shape.

It is apparent from the above that shaped articles of hydrogels formed by polymerization of monomer containing reactive olefinic double bonds are affected by treatment in accord with this invention.

While the invention has been described with particular reference to soft contact lenses, it is apparent that the treatment would also be valuable as a pretreatment in applications where the hydrogel is loaded with an active ingredient, e.g. a drug or pesticide, which is subject to attack by the vinyl groups or where the hydrogel is to used in other physiological applications.

While the present invention has been described in detail along with the preferred embodiments thereof, it is understood that those skilled in the art may effect various modifications within the spirit and scope of this invention.

We claim:

1. A method for reducing the irritant effect resulting when a hydrogel polymer in the shape of a contact lens and formed by the copolymerization of a major amount of a monoester of an olefinic acid selected from the group of acrylic and methacrylic acids having a single olefinic double bond and a polyhydric lower alcohol, and a minor amount of a polymerizable diester of one of said acids, wherein said diester contains at least two olefinic double bonds, is placed in prolonged contact with the living tissue of the eye and eyelid, said method comprising contacting for a suitable period of time said polymer with a solution containing hydrogen sulfide or a salt thereof.

2. A method for reducing the irritant effect resulting when a hydrogel polymer in the shape of a contact lens and formed by the copolymerization of a major amount of a monoester of an olefinic acid selected from the group of acrylic and methacrylic acids having a single olefinic double bond and a polyhydric lower alcohol, and a minor amount of a polymerizable diester which contains at least two olefinic double bonds, is placed in prolonged contact with the living tissue of the eye and eyelid, said method comprising contacting for a suitable period of time said polymer with a solution containing a sulfonate salt of the formula

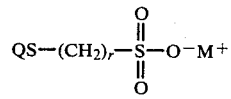

wherein r is an integer selected from zero to five, $M^+$ is a cation, and Q is hydrogen or $M^+$.

3. The method of claim 2 in which said sulfonate salt is sodium thiosulfate.

4. The method of the claims of 1 and 2 wherein said solution includes a solvent medium selected from the group consisting of water, sodium borate, methanol, ethanol, propanol, and mixtures thereof and said hydrogen sulfide, or a salt thereof, or said sulfonate salt is present in a concentration of between 1% by weight and saturation in said solvent medium.

* * * * *